July 12, 1960   E. J. HERBENAR   2,944,829
SELF-ADJUSTING PIVOT JOINT FOR VEHICLE STEERING LINKAGE
Filed Nov. 26, 1957
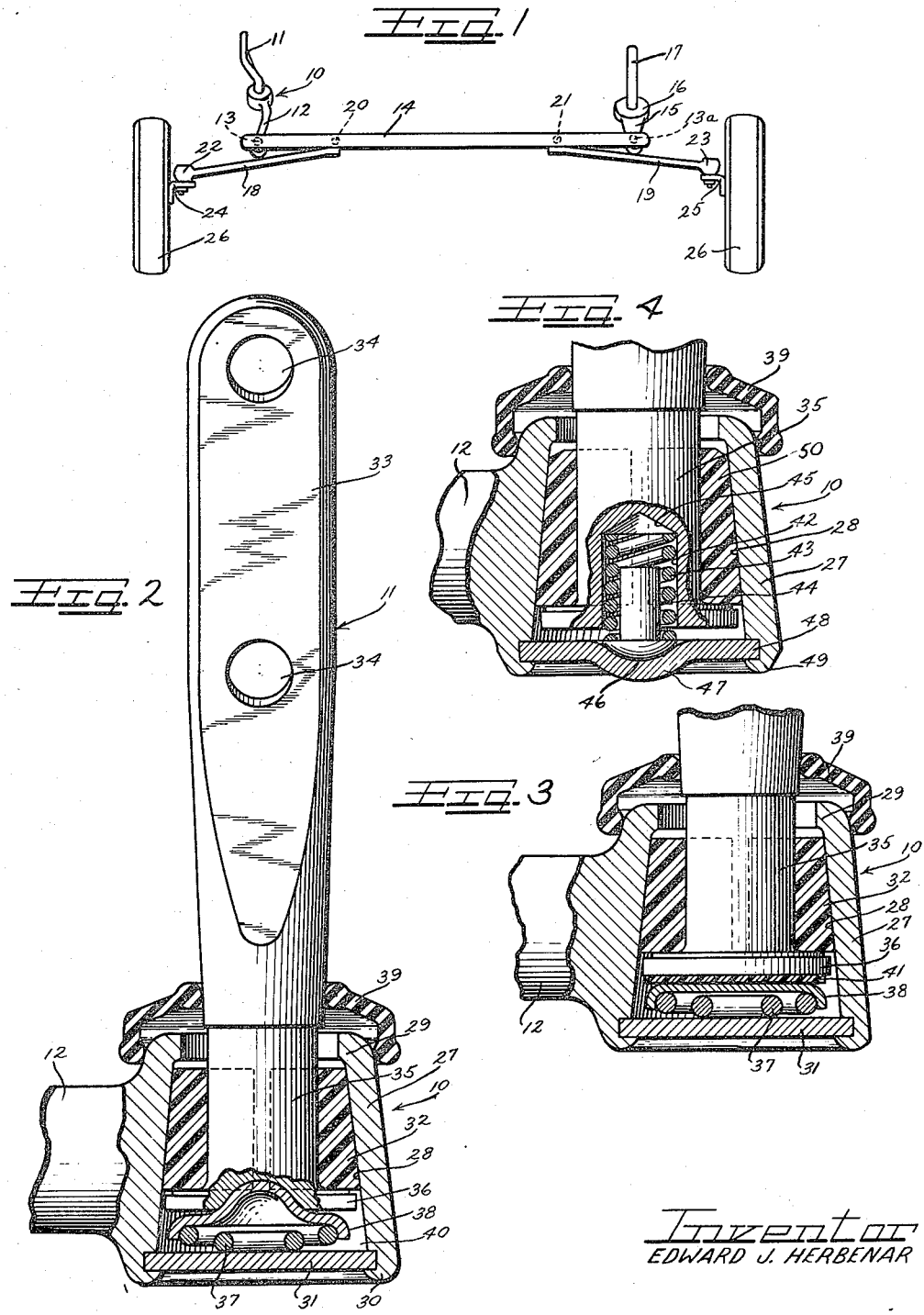
Inventor
EDWARD J. HERBENAR United States Patent Office 2,944,829
Patented July 12, 1960

2,944,829
SELF-ADJUSTING PIVOT JOINT FOR VEHICLE STEERING LINKAGE

Edward J. Herbenar, Detroit, Mich., assignor to Thompson Ramo Wooldridge Inc., a corporation of Ohio Filed Nov. 26, 1957, Ser. No. 698,959

8 Claims. (Cl. 280—95)

The present invention relates broadly to steering linkages for automobiles and the like, and is more particularly concerned with a novel self-adjusting pivot joint for use in connection therewith.

This invention features a new and improved pivot joint which may be connected to the cross linkage of an automotive steering system, and which is provided with a socket member wherein there is received an integral fastening bracket arm. A particular usage for a structure of this type lies where rotation with no substantial angularity is required, and an application which has proven well suited is with an idler arm on an automobile. The joint includes a socket or housing member carried by the idler arm and having tapered inner walls against which there snugly fits tapered bearings supporting therewithin an integral stud and bracket. Positioned beneath the base of the stud in contact with the bottom of the socket is spring means which assures continuous cushioned contact between the bearing, stud and socket inner walls. By means of this arrangement vertical and horizontal loads are taken by the spring, bearings and integral bracket and stud, while turning takes place between the stud and the bearings. As the bearings wear during actual use, the spring forces upwardly on the bearings to keep them in close fitting contact around the stud of the bracket member.

It is, therefore, an important aim of the present invention to provide a novel joint for automotive steering linkages characterized by self-adjustment to compensate for wear and the imposition of forces thereon from various directions while permitting free rotation of parts.

Another object of the invention is to provide a new and improved joint construction for supporting an integral arm and bracket in steering assemblies which is permanently lubricated and completely sealed.

Another object of this invention lies in the provision of a novel joint for automotive steering linkages which is constructed of a minimum number of parts and may be readily assembled at relatively low cost.

Another object of the invention is to provide a joint for a steering linkage which will firmly transmit steering movements while accommodating rotation and limited tilting, and at the same time absorbing noise and dampening shock.

A further object of the invention is to provide a self-adjusting pivot joint comprised of a socket member having tapered inner walls supporting bearing members in firm and cushioned surrounding relation to an integral arm and bracket under which there is located spring means to maintain the bearing members in continuous resilient contact with the integral bracket arm and socket member.

A still further object of the present invention is to provide a new and improved pivot joint for an integral stud and bracket, in which the stud is provided with a bore receiving a spring and nose member supported on the bottom of the joint housing, whereby increased bearing length is obtained.

Other objects and advantages will become more apparent with the teachings of the principles of the invention in connection with the disclosure of the preferred embodiment in the specification, claims and drawings in which:

Figure 1 is a somewhat diagrammatic plan view of a steering linkage showing the present invention as installed thereon;

Figure 2 is an enlarged view of the joint construction with the socket portion thereof in section;

Figure 3 is a sectional view of a modified form of the invention; and

Figure 4 is a sectional view of a further modification to the present invention.

Referring now to the drawings, there is identified by the numeral 10 the joint construction of this invention shown as supporting an integral stud and bracket 11, the joint in turn being carried by an idler arm 12 movable through a ball and socket joint 13 upon the cross-link 14. Connected by another ball and socket joint 13a to the opposite end of the link is a pitman arm 15 having an eye end 16 receiving the pitman arm shaft 17 which rotates to swing the pitman arm. Tie rods 18 and 19 are joined to the cross-link 14 at the points 20 and 21, respectively. The opposite ends of said tie rods support ball and socket joints 22 and 23 to which are connected, respectively, the steering arms 24 and 25 for the wheels 26. The joint 10 of this invention accommodates swinging movement of the idler arm in response to longitudinal shifting of the cross-link 14 by the pitman arm.

As shown in Figure 2, the joint 10 supported at the end of the idler arm 12 includes a cup-shaped housing 27 having tapered inner walls 28. The housing is open-ended, and at its upper portion the side walls are inturned to form a flanged portion 29, while the bottom of said housing is counterbored and spun over at 30 to receive and hold a plate or plug 31. Arranged within the housing in firm contact with the tapered inner walls thereof are a pair of tapered bearings 32 which may be of phenolic or other suitable plastic and preferably are of the laminated type. Supported within the bearings 32 is the combined stud and fastener bracket 11. This member 11 comprises an attaching portion 33 bored at 34 for securement to the frame or other structure on the automobile, while at the bottom of the member is a cylindrical stud portion 35 around which is arranged the bearings 32.

The stud portion 35 of the bracket 11 is provided with a radially extending flange or head 36, and it is between this flange and the flange portion 29 of the cup-shaped housing 27 that the bearings 32 are confined to a limited degree. The flange 36 also provides a bearing surface against which a conical spring 37 maintained within a retainer 38 may act. The plate or plug 31 functions to maintain the parts within the housing 27, while at the upper portion of the housing in contact with the outer walls thereof and the circumference of the bracket 11 is a dust cover 39 preferably of a suitable plastic material which serves to seal out foreign material and maintain the lubricant within the housing. A space 40 is provided between the flange 36 of the bracket 11 and the plate 31 sealing the housing 27, and it is into this location that lubricant may be packed at the time of original assembly of the housing and the parts shown as located therein.

A slight modification of applicant's invention is shown in Figure 3. There is located between the spring 37 and retainer 38 and the base or radial flange 36 of the stud 35 a solid washer or disk 41 of nylon or other suitable low friction insulating material. This has been found in actual practice to be an effective means whereby the turning torque on the stud 35 may be reduced and the joint insulated from vibration noises.

In order to obtain greater bearing length, the construction shown in Figure 4 may be employed. It may be seen therefrom that the stud portion 35 of the bracket 11 is bored centrally along its length as at 42 to receive therein a spring 43 into which passes a nose 44 of nylon, steel or other suitable material. The bore 43 is countersunk at one end and the spring bears against the tapered walls 45 thereof. The spring is urged upwardly at its opposite end by the substantially flat bottom face of the nose, and the rounded head 46 of said nose is snugly received in the concave center portion 47 of the plug 48 carried by the counterbored and spun over lips 49 of the cup-shaped housing 27.

It may be seen from the last-described arrangement that it is now possible to utilize bearings 50 of greater length than the bearings 32 of the other forms of the invention, and thereby greater contact area between said bearings 50 and the tapered inner walls 28 of the housing obtained. Further, by utilizing nylon as the nose material, the stud is substantially completely insulated from the housing and a more quiet joint provided.

The operation of the present invention may be described as follows: Loads having either a vertical or horizontal direction are taken by the springs 37 or 43, the bearings 32 or 50, and the stud portion 35 of the integral stud and bracket 11. Rotation between the bracket 11 and the idler arm 12 occurs by turning of the stud 35 with respect to the bearings 32 or 50. As normal wear of the bearings 32 or 50 occurs around the stud 35, the load of the spring 37 or 43 forces said bearings upwardly in the housing 27 and the bearings 32 or 50 into firm surrounding contact with the stud 35. A tight fit between the stud, bearings and housing is thereby assured, yet there is sufficient resiliency in the joint to permit the application of forces from a number of directions. The arrangement herein disclosed is of relatively simple construction and low cost, while at the same time permitting a relatively simple assembly of the parts. Lubrication is permanently maintained within the housing, and all parts carried therewithin are protected against any possible infiltration of foreign material. A stud which is integral with the bracket is provided, and an adjustment of the stud within the housing is accomplished with no additional manual effort after assembly of the parts.

I have in the drawings and specifications, presented a detailed disclosure of the preferred embodiments of my invention, and it is to be understood that I do not intend to limit the invention to the specific form disclosed, but intend to cover all modifications, changes and alternative constructions and methods falling within the scope of the principles taught by my invention.

I claim as my invention:

1. In a steering linkage of the type including a crosslink, tie rods having inner ends connected to the crosslink adjacent but inwardly from the ends of the crosslink, an idler arm supporting one end of the link and a pitman arm supporting the other end of the link, and a mounting bracket for the idler arm, the improvement of a permanently lubricated joint between the idler arm and bracket, said joint comprising a cup-shaped housing having tapered inner surfaces and inwardly turned portions at opposite ends thereof, one end of the bracket having a cylindrical stud portion with radial flange thereon received in the housing, opposed bearings seated in an upright position on the radial flange and having tapered outer surfaces in slidable contact with the housing inner surfaces and generally cylindrical inner surfaces conforming to the cylindrical stud portion and essentially completely surrounding the same, and spring means in the housing acting on the bracket stud portion urging the bearings relative to the housing inner surfaces to a position at which the bearings are relatively more closely spaced from the upper end of the housing than from the lower end thereof and for maintaining the bearings in good bearing relation with the bracket stud portion.

2. In a steering linkage of the type including a crosslink, tie rods having inner ends connected to the crosslink adjacent but inwardly from the ends of the crosslink, an idler arm supporting one end of the link and a pitman arm supporting the other end of the link, and a mounting bracket for the idler arm, the improvement of a permanently lubricated joint between the idler arm and bracket, said joint comprising a cup-shaped housing having tapered inner surfaces and inwardly turned portions at opposite ends thereof, one end of the bracket having a cylindrical stud portion with radial flange thereon received in the housing, opposed bearings having essentially flat and parallel end surfaces seated upon the radial flange in an upright position thereon, said bearings being closely circumferentially spaced and having tapered outer surfaces in slidable contact with the housing inner surfaces and generally cylindrical inner surfaces conforming to the cylindrical stud portion and essentially completely surrounding the same, and spring means in the housing acting on the bracket stud portion urging the bearings relative to the housing inner surfaces to a position at which the bearings are relatively more closely spaced from the upper end of the housing than from the lower end thereof and for maintaining the bearings in good bearing relation with the bracket stud portion.

3. In a steering linkage of the type including a crosslink, tie rods having inner ends connected to the crosslink adjacent but inwardly from the ends of the crosslink, an idler arm supporting one end of the link and a pitman arm supporting the outer end of the link, and a mounting bracket for the idler arm, the improvement of a permanently lubricated joint between the idler arm and bracket, said joint comprising a cup-shaped housing having tapered inner surfaces and inwardly turned portions at opposite ends thereof, one end of the bracket having a cylindrical stud portion with a radial flange at one end received in the housing, opposed bearings seated in an upright position on the radial flange, each of the bearings having a generally cylindrical axially extending groove formed therein extending between opposite ends thereof and conforming to the curvature of the bracket stud portion for close fitting contact therewith, each bearing being further provided with a tapered outer surface in slidable contact with the housing inner surface, and spring means in the housing acting on the bracket stud portion urging the bearings relative to the housing inner surfaces to a position at which the bearings are relatively more closely spaced from the upper end of the housing than from the lower end thereof and for maintaining the bearings in good bearing relation with the bracket stud portion.

4. A joint assembly for supporting idler arms and the like, comprising a cup-shaped housing integral with the idler arm and open at opposite ends, an inwardly directed flange on one end of the housing, a closure cap closing the opposite ends of the housing, a bracket member for the idler arm having a cylindrical stud portion with radial flange thereon received in the housing, opposed bearings seated in an upright position on the radial flange and having tapered outer surfaces in slidable contact with the housing inner surfaces and generally cylindrical inner surfaces conforming to the cylindrical stud portion and essentially completely surrounding the same, and spring means bearing against the stud radial flange and closure cap urging the bearings relative to the housing inner surfaces to a position at which the bearings are relatively more closely spaced from the inwardly turned flange on the housing than from the closure cap and for maintaining the bearings in good bearing relation with the bracket stud portion.

5. A structure of the character defined in claim 4, and which further comprises a disk member between the radial flange on the stud portion and the spring means for reducing the turning torque on said stud portion.

6. A structure of the character defined in claim 4, and in which the stud portion has a central bore extending partially therein, and which further comprises spring means received in said bore and a nose member received within the spring means and in contact with the closure cap, said spring means maintaining the bearing outer walls against the housing inner walls and the stud portion firmly within said bearing and pressing upwardly thereagainst.

7. A joint assembly for supporting idler arms and the like, comprising a cup-shaped housing integral with the idler arm and open at opposite ends, an inwardly directed flange on one end of the housing, a closure cap closing the opposite end of the housing, a bracket member for the idler arm having a cylindrical stud portion with radial flange thereon received in the housing, opposed bearings seated in an upright position on the radial flange, each of the bearings having a generally cylindrical axially extending groove formed therein extending between opposite ends thereof and conforming to the curvature of the bracket stud portion for close fitting contact therewith, each bearing being further provided with a tapered outer surface in slidable contact with the housing inner surface and spring means bearing against the stud radial flange and closure cap urging the bearings relative to the housing inner surfaces to a position at which the bearings are relatively more closely spaced from the inwardly turned flange on the housing than from the closure cap and for maintaining the bearings in good bearing relation with the bracket stud portion.

8. A joint assembly for supporting idler arms and the like, comprising a cup-shaped housing integral with the idler arm and open at opposite ends, an inwardly directed flange on one end of the housing, a closure cap closing the opposite end of the housing, a bracket member for the idler arm having a cylindrical stud portion with radial flange thereon received in the housing, opposed bearings having essentially flat and parallel end surfaces seated upon the radial flange in an upright position thereon, said bearings being closely circumferentially spaced and having tapered outer surfaces in slidable contact with the housing inner surfaces and generally cylindrical inner surfaces conforming to the cylindrical stud portion and essentially completely surrounding the same, and spring means bearing against the stud radial flange and closure cap urging the bearings relative to the housing inner surfaces to a position at which the bearings are relatively more closely spaced from the inwardly turned flange on the housing than from the closure cap and for maintaining the bearings in good bearing relation with the bracket stud portion.

References Cited in the file of this patent

UNITED STATES PATENTS

| | | |
|---|---|---|
| 1,948,757 | Harris | Feb. 27, 1934 |
| 2,298,544 | Ulinski | Oct. 13, 1942 |
| 2,464,982 | Leighton | Mar. 22, 1949 |
| 2,470,215 | Graham | May 17, 1949 |
| 2,544,582 | Booth | Mar. 6, 1951 |
| 2,755,116 | Alldredge | July 17, 1956 |
| 2,778,664 | Herbenar | Jan. 22, 1957 |

FOREIGN PATENTS

| | | |
|---|---|---|
| 473,254 | Great Britain | Oct. 8, 1937 |